US010673136B1

(12) United States Patent
Shiao et al.

(10) Patent No.: US 10,673,136 B1
(45) Date of Patent: Jun. 2, 2020

(54) CONTROL SYSTEM AND METHOD FOR TRAINING A RECONFIGURABLE ANTENNA

(71) Applicant: Dell Products, LP, Round Rock, TX (US)

(72) Inventors: Stephen Shiao, Coral Springs, FL (US); Suresh K. Ramasamy, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/380,672

(22) Filed: Apr. 10, 2019

(51) Int. Cl.
*H01Q 3/26* (2006.01)
*H04B 7/06* (2006.01)
*H04B 7/08* (2006.01)

(52) U.S. Cl.
CPC ............ *H01Q 3/26* (2013.01); *H04B 7/0613* (2013.01); *H04B 7/0837* (2013.01)

(58) Field of Classification Search
CPC ..... H04W 64/00; H04W 4/025; H04W 24/02; H04W 16/28; H04W 24/10; H04W 84/18; H04W 84/12; H04W 16/10; H04W 28/18; H04W 88/08; H04W 8/005; H04W 16/26; H04W 4/029; H04W 88/005; H04W 88/06; H04W 12/06; H04W 16/18; H04W 24/00; H04W 28/02; H04W 28/0226; G01S 1/026; G01S 1/028; G01S 2205/006; G01S 2205/008; G01S 5/0009; G01S 5/0018; G01S 5/0054; G01S 5/02; G01S 5/0205; G01S 5/021; G01S 5/0252; G01S 5/0257; G01S 5/0278; G01S 5/06; G01S 5/10; G01S 5/0263; G01S 13/346; G01S 13/762; G01S 2013/0254; G01S 3/06; H04B 7/0617; H04B 7/0456; H04B 7/0452; H04B 7/063; H04B 7/0632; H04B 7/0417; H04B 7/0639; H04B 7/0413; H04B 7/0486; H04B 7/0634; H04B 7/0691; H04B 7/0695; H04B 7/022; H04B 7/0469; H04B 7/0619;
(Continued)

(56) References Cited

U.S. PATENT DOCUMENTS

| | | | | |
|---|---|---|---|---|
| 2008/0139153 | A1* | 6/2008 | Tuo | H04B 7/0695 455/277.2 |
| 2014/0003365 | A1* | 1/2014 | Carey | H04W 72/085 370/329 |
| 2018/0198515 | A1* | 7/2018 | Lotter | H04B 7/1555 |

* cited by examiner

*Primary Examiner* — Golam Sorowar
(74) *Attorney, Agent, or Firm* — Prol Intellectual Property Law, PLLC; H. Kenneth Prol

(57) ABSTRACT

An information handling system operating a reconfigurable antenna training control system may comprise a configurable antenna system in one of a plurality of available configurations transceiving a radio frequency signal, and a radio frequency system measuring performance metrics for the signal transceived according to each available configuration over a training time period preset based on historical performance and stability of each available configuration. An antenna front end system may execute instructions of the reconfigurable antenna training control system to determine a weighted performance metric based on the measured performance metrics and on historical performance metrics for each candidate configuration, to compare the weighted performance metrics for each configuration, and to identify one of the configurations having a highest weighted performance metric as an optimal configuration. The configurable antenna may then establish a wireless link using the optimal configuration.

20 Claims, 5 Drawing Sheets

(58) Field of Classification Search
CPC ........ H04B 7/0478; H04B 7/12; H04B 1/707; H04B 5/0031; H04B 5/0037; H01Q 3/24; H01Q 9/0407; H01Q 1/246; H01Q 21/29; H01Q 13/10; H01Q 1/1257; H01Q 13/203; H01Q 15/0086; H01Q 1/007; H01Q 21/061; H01Q 21/062; H01Q 21/08; H01Q 3/2605; H01Q 5/321; H01Q 5/342; H01Q 9/0435; H01Q 9/145; H01Q 9/285; H01Q 13/20; H01Q 13/28
See application file for complete search history.

US 10,673,136 B1

CONTROL SYSTEM AND METHOD FOR TRAINING A RECONFIGURABLE ANTENNA

FIELD OF THE DISCLOSURE

The present disclosure generally relates to a radio frequency antenna systems of information handling systems. The present disclosure more specifically relates to methods and systems for controlling training of reconfigurable antennas.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of wireless radio frequency signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
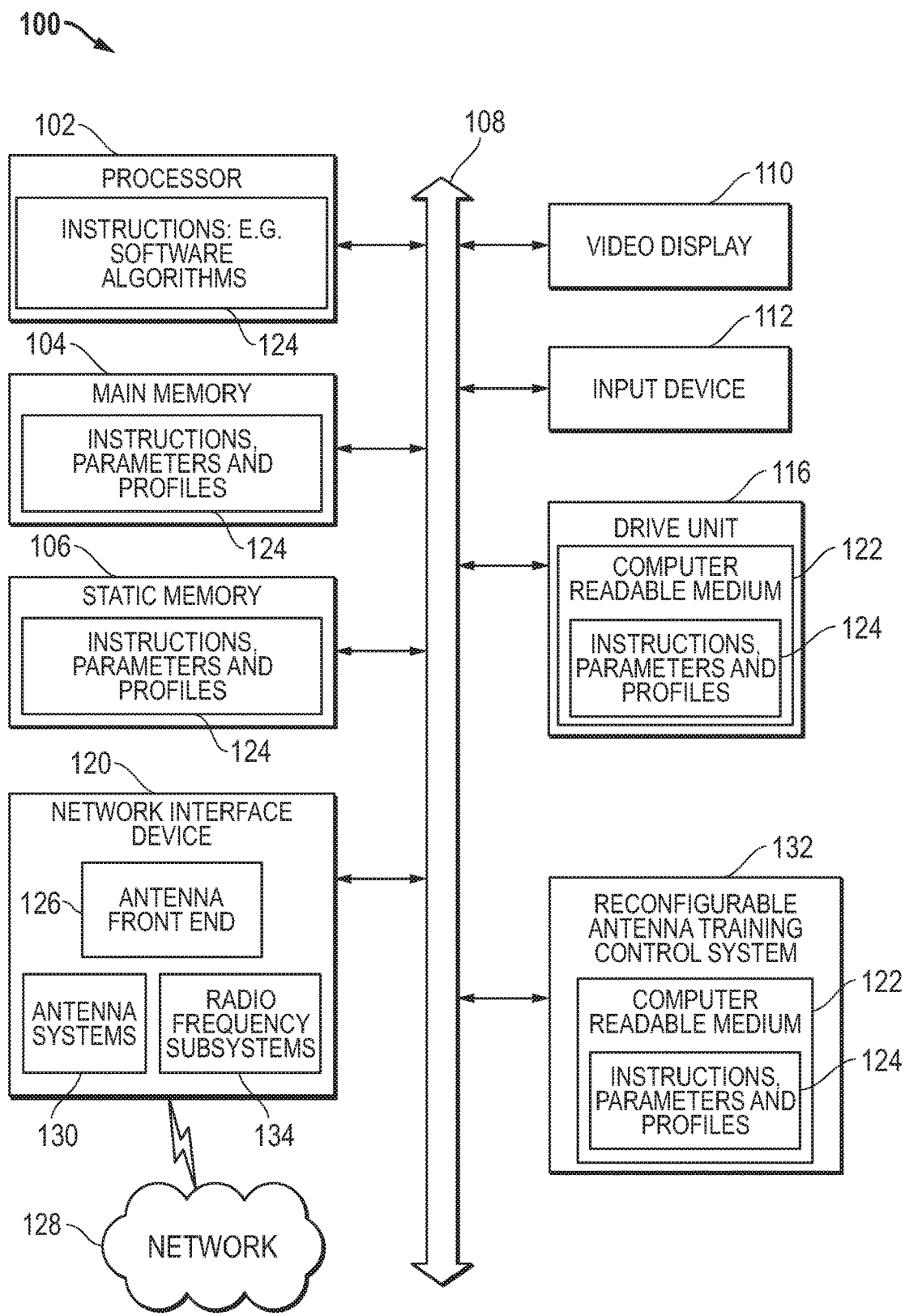
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to quickly and reliably access high quality data signals increase in demand. Mobile information handling systems of the present embodiment may dynamically configure one or more reconfigurable antennas so as to maximize the quality of signals transceived by such antennas. Reconfigurable antennas in embodiments described herein may be capable of operating in a plurality of configurations, where each configuration generates a different electromagnetic radiation pattern, providing more methods for optimizing signal quality at the mobile information handling system in comparison to the fixed pattern antennas of previous systems.

The reconfigurable antenna embodiments may include active or real-time configurable antenna elements which may comprise an antenna module containing a set of biasing networks which may be used to set varying radiation patterns. In this way, the configurable antenna module may obtain improved signal gain and an improved link over fixed antenna radiation patterns via selection of radiation patterns and monitoring results. A control system is implemented over the antenna module and biasing networks to monitor and control selection of antenna patterns. Selection of an optimal antenna radiation pattern and reconfigurable antenna configuration may involve training the system to determine among various configuration an optimal link configuration. This training period may occur separately or as part of the data transmissions but it may be useful to have the training period have minimal impact on the system operation or the data transmissions or reception.

Different antenna pattern configurations may be more optimal than others in embodiments described herein, dependent upon operating conditions of the information handling system at a given time. For example, quality of wireless links established via antennas transceiving according to a given radiation pattern may vary as the channel conditions of the wireless links vary. Thus, a method is needed to dynamically adjust the antenna pattern or train the configurable antenna module system to optimize signal quality as channel conditions change over time.

Embodiments of the present disclosure address this issue by performing an antenna pattern training session at routine intervals or upon receipt of an instruction to do so, in order to determine the most optimal antenna pattern configuration for current operating conditions. The reconfigurable antenna training control system in embodiments of the present disclosure may operate to test a plurality of possible antenna configurations by transceiving from an antenna according to a first pattern, testing one or more signal quality parameters on the transceiving link according to the first pattern, repeating these steps for each available antenna pattern, then identifying the pattern associated with the highest scoring signal quality parameter as the most optimal. The reconfigurable antenna training control system in embodiments may use a non-dedicated training method, which may involve sampling of the signal quality parameters for each of the plurality of antenna patterns occurring simultaneously with the transmission or receipt of content data according to usual operation of the information handling system. Use of such a non-dedicated training method in some embodiments may allow users to continue to transceive all content data during the training session, but could also cause a fluctuation in the quality of the signal transceived during the training session as different antenna patterns are tested. Because the quality of signals may fluctuate while the mobile information handling system attempts to communicate via those signals, when implementing the non-dedicated training system, there is a need to limit the training period, and thus limit the time period in which the mobile information handling system communication signals experience suboptimal quality. However, there is also a competing need to extend such a training period long enough to ensure that sufficient signal quality measurements for each available antenna pattern can be gathered to determine which of these antenna patterns is most optimal in the current operational and environmental conditions. Thus, there is a need to optimize the training time period length in order to balance these competing needs.

Embodiments of the present disclosure address this issue by determining an optimal training time period length for each of the available antenna patterns based on historical signal quality for each of the available antenna patterns. For example, in some embodiments described herein, signal quality may be gauged based on received signal strength indicator (RSSI) values. In such embodiments, the amount of time dedicated toward testing the signal quality of any individual antenna pattern may be set based on a comparison between historical RSSI values for that individual antenna pattern and all other available antenna patterns. In other words, the amount of time dedicated toward testing signal quality of a given antenna pattern may depend upon the likelihood that antenna pattern will generate a high quality signal, as estimated based upon past performance of that pattern. In such a way, embodiments of the present disclosure may more efficiently use the limited time available for training the reconfigurable antenna by focusing more resources on antenna patterns that are more likely to generate higher quality wireless links.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100. Code instructions 124 may include algorithms, instructions, parameters or profiles for execution in software, firmware, hardware, or any combination.

The information handling system 100 may include a processor 102 such as a central processing unit (CPU), control logic or some combination of the same. Any of the processing resources may operate to execute code that is either firmware or software code for example. Moreover, the information handling system 100 can include memory such as main memory 104, static memory 106, computer readable medium 122 storing instructions 124 of the reconfigurable antenna training control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, modem circuitry, one or more unified radio frequency front end circuits, one or more wireless controller circuits, amplifiers, antenna systems 130 and other radio frequency subsystem circuitry 134 for wireless communications via multiple radio access technologies. Each radiofrequency subsystem 134 may communicate with one or more wireless technology protocols. Antenna systems 130 may include a reconfigurable antenna as described in various embodiments herein and along with radio frequency subsystems 134, antenna front end 126, and other components of network interface device 120 may be utilized as a reconfigurable antenna module according to various embodiments herein.

The network interface device 120, which also may be referred to as wireless adapter 120 herein, may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. The wireless network may have a wireless mesh architecture in accordance with mesh networks described by the wireless data communications standards or similar standards in some embodiments but not necessarily in all embodiments.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, the radiofrequency subsystem 134 may operate on a licensed WWAN wireless radio with authorization for subscriber access to a wireless service provider on a carrier licensed frequency band.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics, scattering, and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments via training according to the antenna optimization system of the present disclosure.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 134 including transmitters and wireless controllers for connecting via a multitude of wireless links. In an example embodiment, an information handling system may have an antenna system transmitter 130 for 5G small cell WWAN, Wi-Fi WLAN or WiGig connectivity and one or more additional antenna system transmitters 130 for macro-cellular communication. The radio frequency subsystems 134 may include wireless controllers to manage authentication, connectivity, communications, power levels for transmission, buffering, error correction, baseband processing, and other functions of the wireless adapter 120.

The radio frequency subsystems 134 of the wireless adapters may also measure various metrics relating to wireless communication pursuant to operation of an antenna optimization system as in the present disclosure. For example, the wireless controller of a radio frequency subsystem 134 may manage detecting and measuring several wireless performance metrics including received signal strength levels, bit error rates, signal to noise ratios, latencies, jitter, and other metrics relating to signal quality and strength. In one embodiment, a wireless controller of a wireless interface adapter 120 may manage one or more radio frequency subsystems 134. The wireless controller may also manage transmission power levels that directly affect radio frequency subsystem power consumption as well as transmission power levels from the plurality of antenna systems 130. The transmission power levels from the antenna systems 130 may be relevant to specific absorption rate (SAR) safety limitations for transmitting mobile information handling systems. To control and measure power consumption via a radio frequency subsystem 134, the radio frequency subsystem 134 may control and measure current and voltage power that is directed to operate one or more antenna systems 130.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer based functions disclosed herein. For example, instructions 124 may execute a reconfigurable antenna training control system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the reconfigurable antenna training control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the reconfigurable antenna training control system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the reconfigurable antenna training control system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The reconfigurable antenna training control system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a reconfigurable antenna training control system 132 that may be operably connected to the bus 108. The reconfigurable antenna training control system 132 computer readable medium 122 may also contain space for data storage. The reconfigurable antenna training control system 132 may perform tasks related to iteratively and routinely determining optimal configurations of a plurality of electrically conductive elements within a reconfigurable antenna 130 in order to optimize performance of all currently transceiving signals.

In an embodiment, the reconfigurable antenna training control system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
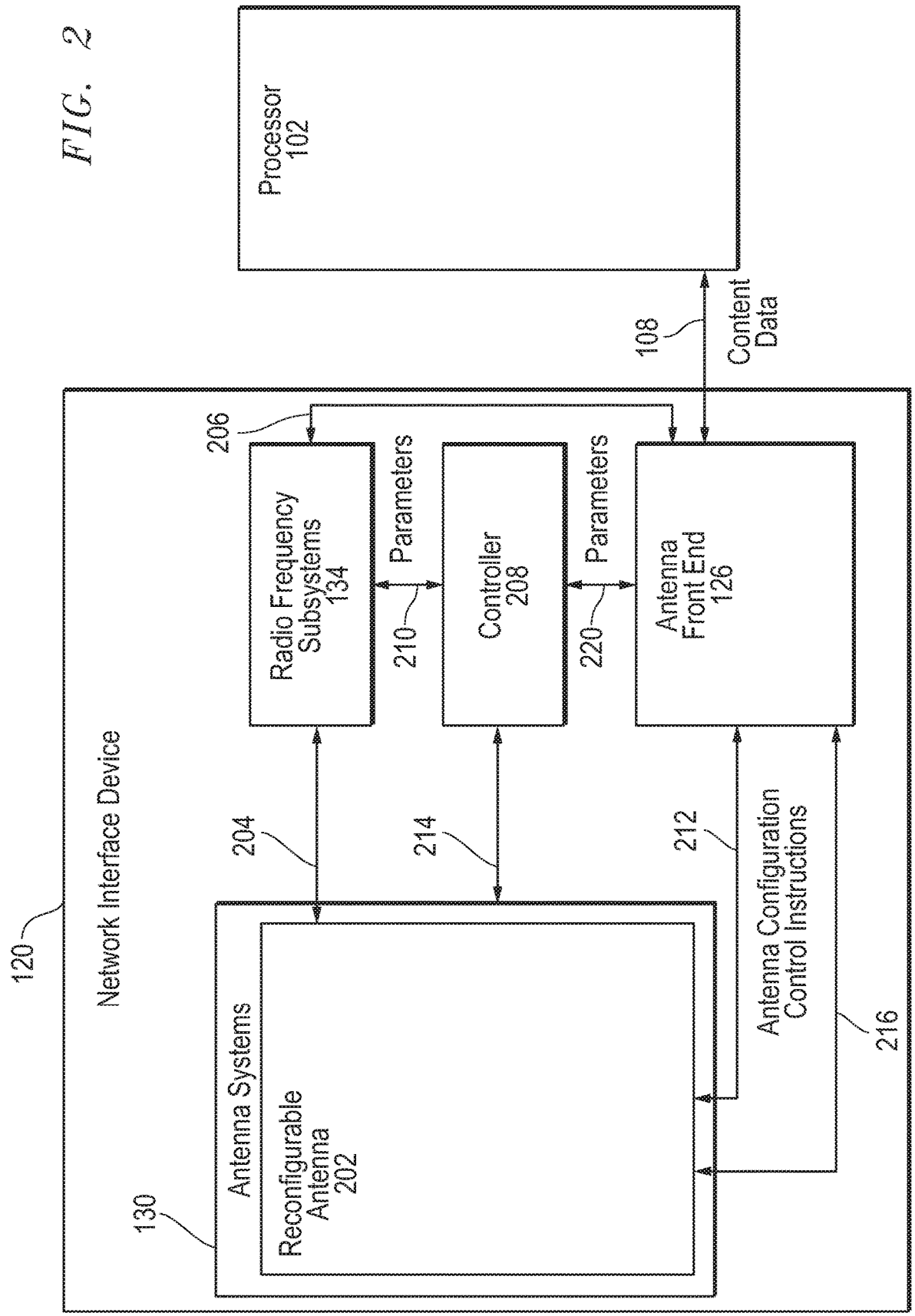
FIG. 2 is a graphical diagram of a reconfigurable antenna according to an embodiment of the present disclosure.

FIG. 2 is a graphical diagram of an antenna front end module controlling the radiation pattern of a reconfigurable antenna according to an embodiment of the present disclosure. In an embodiment of the present disclosure, the processor 102 may transmit content data to the antenna front end 126 via bus 108 for transmission by the network interface device 120. Similarly, the antenna front end 126 may transmit content data received by the network interface device 120 to the processor 102 via bus 108. The antenna front end 126 may transmit content data received from the processor 102 to the antenna systems 130 via RF line 216 in an embodiment. RF line 216 may also be used to transmit content data received at the antenna systems 130 to the antenna front end 126 for delivery to the processor 102 in an embodiment.

The antenna systems 130 of the wireless interface device 120 may include one or more reconfigurable antennas 202. Reconfigurable antennas 202 may be capable of transceiving radio frequency signals according to a plurality of antenna radiation patterns. The reconfigurable antenna 202 may undergo a plurality of training sessions, during which the reconfigurable antenna 202 transceives radio frequency signals in one of a plurality of available radiation patterns, and the quality of such signals is measured. Such signal quality measurements may be made several times during the duration of such a training session, and then averaged to determine an average signal quality over the training session. As such, the length of the training session may impact the accuracy of the average signal quality measurements for a given antenna radiation pattern in gauging true signal quality.

The wireless interface device 120 in an embodiment may further include radio frequency subsystems 134, which may measure various metrics describing the quality of radio frequency signals transceived by the reconfigurable antenna 202. For example, a wireless controller of a radio frequency subsystem 134 may manage detecting and measuring received signal strength levels (e.g. RSSI), bit error rates, signal to noise ratios, latencies, jitter, and other metrics relating to signal quality and strength. The radio frequency subsystem 134 in an example embodiment may measure metrics/feedback parameters transceived at the antenna systems 130 via RF line 204, including RSSI values in an embodiment of one or more wireless links established by the reconfigurable antenna 202.

The radio frequency subsystems 134 in some embodiments of the present disclosure may operate to process and transceive signals including signals adhering to standards such as, for example, IEEE 802.11 Wi-Fi, IEEE 802.11ad WiGig, and/or IEEE 802.15 WPAN. In other embodiments, the radio frequency subsystems 134 and antenna front end 126 including a WWAN module acting as a wireless WWAN modem, and may operate to process and transceive signals including signals adhering to 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. The radio frequency subsystems 134 in an embodiment may also transmit the metrics/feedback parameters (e.g. RSSI values for a plurality of wireless links, each associated with a separate radiation pattern of the reconfigurable antenna 202) to the antenna front end module 126 or other controller or processor executing instructions of the various embodiments described herein. For example, the radio frequency subsystems 134 in an embodiment may transfer the metrics/feedback parameters to the antenna front end module 126 or other controller or processor via a GPIO line 206. In other embodiments, line 206 may be an I2C line, or an RF line. In still other embodiments, the radio frequency subsystems 134 may transfer the metrics/feedback parameters to a microcontroller 208 in addition to, or in lieu of transmission to the antenna front end 126. The radio frequency subsystems 134 in such an embodiment may transmit such metrics parameters to the controller 208 via line 208 which may comprise a GPIO line, an I2C line, or an RF line.

The antenna front end module 126, the controller 208, or another processor executing a reconfigurable antenna training control system may work to optimize antenna radiation patterns, dynamically set the duration of training time periods, and tune radio signals in an embodiment. References to the antenna front end module 126 herein may be intended to include a WLAN, WWAN, Wi-Fi, or LTE front end module as well. In an example embodiment, the antenna front end module 126 may include a microcontroller which may operate a reconfigurable antenna training control system to select durations of training time periods for optimizing antenna radiation pattern, and to select an optimal antenna radiation pattern determined during such training time periods. In other embodiments, separate controller 208 or another processor in the network interface device 120 or elsewhere on the host information handling system may operate some or all of the reconfigurable antenna training control system to select durations of training time periods for optimizing antenna radiation pattern, and to select an optimal antenna radiation pattern determined during such training time periods. Such training may be performed in routine intervals, or in response to antenna trigger inputs including WLAN or WWAN radio performance inputs, GPS or accelerometer data, antenna configuration data, and other sensor data.

In some embodiments, the controller 208 may be integrated into another portion of the wireless interface device 120. For example, in some aspects, such a microcontroller 208 may be integrated into one or more radio frequency subsystems 134. In yet other aspects, some or all of the operations of such a microcontroller 208 may be distributed across microprocessing capabilities embedded within several portions of the wireless interface device 120 or even elsewhere in an information handling system. For example, in other embodiments, the code instructions of the reconfigurable antenna training control system to select durations of training time periods for optimizing antenna radiation pattern, and to select an optimal antenna radiation pattern determined during such training time periods may be executed by a processor 102, such as a CPU, GPU, or other processing logic, of the information handling system.

The antenna front end module 126 (or other module/controller/processor executing code instructions of the reconfigurable antenna training control system) in an embodiment may optimize the time period dedicated toward training each of the individual antenna patterns in which the reconfigurable antenna 202 is capable of establishing wireless links based on historical measurements of signal quality (e.g. current and past metrics/feedback parameters) for each of those wireless links. The antenna configuration control instructions transmitted from the antenna front end module 126 to the reconfigurable antenna 202 in an embodiment may operate to cap the duration of training sessions for each individual antenna pattern in which the reconfigurable antenna 202 may transceive radio frequency signals. Each of the available antenna radiation patterns in an embodiment may be associated with the same or a different time period. For example, the antenna front end module 126 in an embodiment may allow only a very short time period for training on antenna radiation patterns that have historically resulted in low quality wireless links, while dedicating more of the limited available training time toward training antenna radiation patterns that have better historical signal quality measurements.

The antenna front end module 126 may control the training of the reconfigurable antenna 202 in an embodiment by transmitting antenna configuration control instructions to the reconfigurable antenna 202. The antenna configuration control instructions direct the antenna configuration and thus the radiation pattern in which the reconfigurable antenna 202 transceives radio frequency signals. The controller 208, processor 102, antenna front end module 126 or other controller may alter the radiation pattern of radio frequency signals transmitted or received by the reconfigurable antenna 202 by coupling one of the signals to a parasitic antenna and controlling phase shifting via a microcontroller 208 within the wireless interface device 120 or via the processor 102. Such a parasitic antenna may be used by a tuning and phase shift network within the antenna front end module 126 to direct phase shift such that the parasitic element may influence the current, thereby steering the shape of the RF antenna pattern for one or more transceiving antennas. Additionally, RF pattern shape control may be implemented in some embodiments by tuning for advanced open loop using feedback (AOL) or closed loop using power detection (CL) circuit. Antenna port termination or tuning may be altered to enhance transmission pattern diversity. In another aspect, one of the antenna port terminations or tuning may be altered to increase reflection to increase interference rejection for one or other portions of a transceiving antenna or a parasitic antenna.

During a training period, the antenna front end 126 may instruct the reconfigurable antenna 202 to rotate through each of a plurality of radiation patterns in which it is capable of establishing wireless links, and the radio frequency subsystems 134 may measure and transmit signal quality metrics parameters of each of the resulting wireless links back to the antenna front end 126. The antenna front end module 126 in an embodiment may then determine an optimal one of the wireless links established during the training session based on the received metrics parameters, and based on historical performance of each of the available radiation patterns. Once an optimal wireless link has been identified, the antenna front end module 126 may transmit antenna configuration control instructions to tune the reconfigurable antenna 202 to transceive radio frequency signals via a GPIO line 212 according to the radiation pattern in which the optimal wireless link was established during the training session. In other embodiments in which the controller 208 executes the code instructions of the reconfigurable antenna training control system to identify the optimal wireless link, the controller 208 may transmit antenna configuration control instructions to tune the reconfigurable antenna 202 in a similar manner via a GPIO line 214.

Data received via the reconfigurable antenna 202 (e.g. voice calls, text messages, executable code instructions, etc.) may be forwarded via RF line 216 to the antenna front end 126 and the radio frequency subsystems 134 and to the processor 102 in an embodiment. For example, such data may be transferred via a bus 108 within the mobile information handling system. Such data may also be transmitted from the processor 102 to the wireless interface device 120 for transmission by the reconfigurable antenna 202. Further, in some embodiments, the data 208 may be transceived by the reconfigurable antenna 202 both between training sessions of the reconfigurable antenna 202 and during such training sessions, as with a non-dedicated training method.

Figure 3:
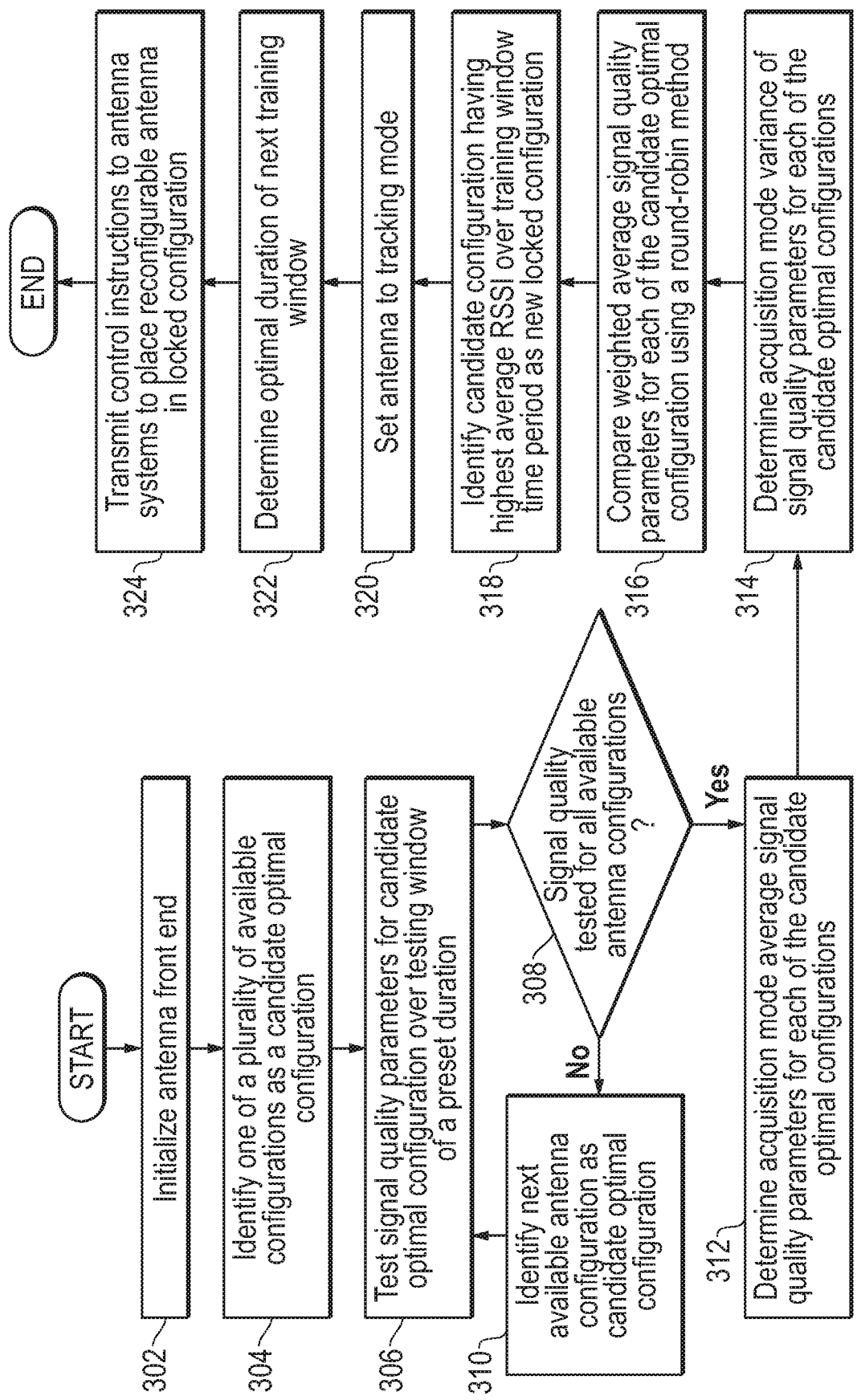
FIG. 3 is a flow diagram illustrating a method of identifying an optimal antenna configuration in an acquisition mode according to an embodiment of the present disclosure.

FIG. 3 is a flow diagram illustrating a method of identifying an optimal antenna configuration based on performance metrics indicating signal quality parameters gathered for each available configuration in an acquisition mode according to an embodiment of the present disclosure. As described herein, embodiments of the present disclosure dynamically adjust antenna patterns to optimize signal quality as channel conditions change over time by performing training sessions for the reconfigurable antenna at routine intervals. Training sessions may be performed while the reconfigurable antenna training control system is set to an acquisition mode, or a tracking mode. The reconfigurable antenna training control system in an embodiment may be set to a default acquisition mode, and may transition to a tracking mode once a first training session is performed and an optimal antenna configuration is determined.

The reconfigurable antenna training control system in an embodiment may be set to a default acquisition mode upon initial startup of the information handling system and/or the network interface device. When set to a default acquisition mode in an embodiment, the reconfigurable antenna training control system in an embodiment may spend an equal amount of time testing performance of wireless links established using each of the available antenna configurations. Once an optimal wireless link is identified using such a round-robin technique, the reconfigurable antenna training control system may switch to a tracking mode. The reconfigurable antenna training control system in embodiments may only be set to a tracking mode once testing metrics have been gathered sufficient to describe past performance of multiple configurations. When placed in the tracking mode, the reconfigurable antenna training control system in an embodiment may dedicate more or less time to testing performance metrics for a given antenna configuration based on the past performance of wireless links established using that given antenna configuration. In the absence of such previous testing metrics that can be used to determine a likelihood that any given configuration will establish a higher quality wireless link than another configuration, the reconfigurable antenna training control system in may remain in a default acquisition mode in order to dedicate an equal amount of time to testing link quality for each of the available configurations.

Although the embodiments of FIG. 3 discuss the method and operation of the reconfigurable antenna training control system with respect to an RSSI performance metric, it is contemplated that several wireless performance metrics may be used including RSSI, data rate, lost packets, bit error rates, signal to noise ratios, latencies, jitter, and other metrics relating to signal quality and strength. Other of these performance metrics may be used in place of RSSI in the method of FIG. 3 in some embodiments. In other embodiments, it is contemplated that multiple performance metrics may be utilized with the embodiments herein including that if FIG. 3.

At block 302, in an embodiment, the antenna front end may be initialized. The antenna front end may be initialized in such a way when the information handling system moves from an off to an on state, or when the network interface device moves from an off state (e.g., "airplane mode") to an on state. As described herein, the reconfigurable antenna training control system in an embodiment may be set to a default acquisition mode. Thus, upon initial startup of the antenna front end, the reconfigurable antenna training control system may be set to the default acquisition mode.

In another embodiment, the reconfigurable antenna training control system may initiate an acquisition mode training window when transitioning from a tracking mode to an acquisition mode. As described herein, the reconfigurable antenna training control system may enter an acquisition mode either on initial startup, or when an optimal antenna configuration cannot be identified during a tracking mode training window, prompting execution of an acquisition mode training window. In such an embodiment, the method described by FIG. 3 may begin with the reconfigurable antenna training control system entering an acquisition mode immediately following execution of a tracking mode training window.

The reconfigurable antenna training control system in an embodiment may identify one of a plurality of available antenna configurations as a candidate optimal configuration at block 304. The reconfigurable antenna in an embodiment may include a plurality of electrically conductive elements that may each receive current from one or more radio frequency subsystems to form a plurality of different electromagnetic radiation patterns. For example, a reconfigurable antenna may include two electrically conductive elements that may each be capable of receiving current from a radio frequency subsystem. In such an embodiment, one of the elements may receive current while the other does not, or both elements may receive current simultaneously to form a dipole, resulting in at least three possible electromagnetic radiation patterns. In other embodiments, the reconfigurable antenna may include more than two elements, which may be combined to generate more than three possible electromagnetic radiation patterns in a similar way. Each of these possible combinations of elements in an embodiment may be associated with one available configuration and stored in a memory accessible by the reconfigurable antenna control system. The reconfigurable antenna control system in an embodiment may identify one of these available configurations as a candidate configuration of interest at block 304.

At block 306, the reconfigurable antenna training control system in an embodiment may test the signal quality parameters for a wireless link established using the candidate optimal configuration over a testing window of a preset duration. As described herein, the duration of each training window in an embodiment may be determined based upon previous performance of wireless links established using various configurations of the reconfigurable antenna. Upon initial startup, previous performance of wireless links established using any of the available configurations may be unknown. Because all previous performance is unknown, the reconfigurable antenna training control system in such an embodiment may dedicate an equal amount of time during an acquisition mode training window to testing performance of wireless links established using each of the available antenna configurations. Thus, the length of such an initial acquisition mode training window may be preset and stored in memory accessible by the reconfigurable antenna training control system in an embodiment.

In other embodiments, the current acquisition training mode may have been initiated immediately following a tracking mode training window in which an optimal configuration could not be identified. In such embodiments, the duration of the current acquisition mode training window may have been preset based on performance of wireless links established using each of the available configurations in previously executed training windows. For example, in an embodiment described with reference to FIG. 5, the duration of the current acquisition mode training window may be equivalent for all candidate configurations as determined at block 524.

The reconfigurable antenna training control system 132 in an embodiment may control scanning for potential future optimal antenna configurations via the antenna over a training window. For example, the reconfigurable antenna training control system 132 may transmit instructions to the antenna systems 130 to place the reconfigurable antenna 202 in a first configuration, and to transceive data while in that configuration over a preset duration of thirty seconds. Various preset durations for such an initial acquisition mode training window are contemplated in other embodiments. Upon completion of the thirty second training window for the first configuration, the reconfigurable antenna training control system 132 in such an embodiment may then transmit instructions to the antenna systems 130 to place the reconfigurable antenna 202 in the next available configuration, and to transceive data over another thirty second training window.

During each of these training windows, the radio frequency subsystems 134 in an embodiment may gather the feedback parameters and store them in a memory accessible by the antenna front end 126. For example, the radio frequency subsystem 134 may store the metrics parameters recorded for each of the configurations during the current acquisition mode training window in memory. The metrics parameters stored in memory in such an embodiment may be associated with the Basic Service Set Identifier (BSSID) for the network (e.g., WLAN) with which the wireless interface device 120 communicates via the wireless links established using each of the available configurations in the current acquisition mode training window. In such a way, the reconfigurable antenna training control system 132 in an embodiment may direct the testing and storage of feedback parameters for each of the candidate configurations over training windows having the same length for each configuration.

The reconfigurable antenna training control system 132 in an embodiment may then access the one or more stored signal quality metrics parameters of a wireless link established using the configuration of interest in an embodiment, including RSSI values for such a link over the most recent training window. In an embodiment, the reconfigurable antenna training control system 132 may receive signal quality metrics parameters from radio frequency subsystems 134 or from other modules, systems, or components capable of measuring signal quality metrics or feedback parameters. In other embodiments, metrics parameters may include a basic service set identifier (BSSID), a link state metric, a number of transmitted/received bytes, a transmission/reception legacy rate, and/or a transmission/reception modulation scheme. Although the reconfigurable antenna training control system 132 as described herein uses RSSI values as signal quality indicators, other embodiments contemplate the use of other signal quality indicators where appropriate, including data rate, latency, jitter, and lost packets. By taking a weighted average of any of these values, the reconfigurable antenna training control system may gauge the current and past performance and stability of wireless links established using the configuration of interest.

In some embodiments, the reconfigurable antenna training control system 132 may exclude RSSI values falling below an adjustable low-level limit or exceeding a preset and fixed high-level limit in an embodiment. For example, the reconfigurable antenna training control system 132 may check raw RSSI values for the configuration of interest, gathered from the radio frequency subsystem 134 against one or more of a preset high-level and low-level threshold value. Each RSSI value in an example embodiment may include a plurality of paired RSSI values, with the values in a single pair representing instantaneously measured quality of the signal received or transmitted via one of two elements in a dipole antenna.

In some embodiments, RSSI pair values in which one of the values in the pair exceeds either a low-level threshold value or a high-level threshold value may be excluded during later determinations of optimal antenna configurations. For example, in an embodiment in which a received signal on one element has an RSSI value of −45 dBm and the transmitted signal on the other element has an RSSI value of −46 dBm, the RSSI pair value may be [−45 dBm, −46 dBm]. In some embodiments, RSSI pair values in which one of the values in the pair exceeds either a low-level threshold value or a high-level threshold value may be excluded from analysis by other modules. In other embodiments, the reconfigurable antenna training control system 132 may exclude from analysis only RSSI pair values in which one of the values in the pair exceeds a high-level threshold value. A fixed value of zero dBm may constitute a high-level threshold value in an embodiment. In such an embodiment, the reconfigurable antenna training control system 132 may determine both of the values in the RSSI pair values falls below the high-level threshold value (e.g. has a value less than 0 dBm), identify those RSSI pair values as valid.

In still other embodiments, the reconfigurable antenna training control system 132 may replace RSSI pair values falling below the low-level threshold with a preset or adaptable low-level threshold value. A low-level threshold value in an embodiment may have an initial value that may later be adjusted based on power settings for the network interface device. For example, a low-level threshold value may be applied in some embodiments when the network interface device is placed in a low-power mode. While operating in a low-power mode, one of a plurality of antenna elements may be placed in an off state and cease to receive a signal. A single RSSI value may be measured in such an embodiment, rather than a pair of values, because RSSI values cannot be measured for a signal that is no longer being received. Such a missing value in a chain of RSSI values measured for an antenna element over a training session may produce erroneous estimations of signal quality for that element of the training session. In order to avoid such erroneous estimations, the reconfigurable antenna training control system 132 in an embodiment may complete the pair by associating the element in the off-state with an adaptive low-level threshold value.

The reconfigurable antenna training control system 132 may include an adaptive low-level invalid RSSI algorithm in an embodiment that sets the adaptive low-level threshold value in an embodiment. Such an algorithm may include detecting when the wireless network adapter in an embodiment has entered a low power mode by receiving an indication of such from the processor, or by comparing the RSSI values in a single pair. If the difference between such RSSI values reaches a preset low-power mode comparison threshold value, the low-level invalid RSSI algorithm logs a low-power mode condition. In an example embodiment, the preset low-power mode comparison threshold value may be 20 dB. For example, in an embodiment in which the preset low-power mode comparison threshold value is 20 dBm, and the reconfigurable antenna training control system 132 receives an RSSI value of [−45 dBm, −93 dBm], it may measure a difference of 48 dBm, which is greater than the low-power mode comparison threshold value. In such an embodiment, the reconfigurable antenna training control system 132 may log a low-power mode condition.

The low-level invalid RSSI algorithm in an embodiment may further include adjusting the low-level threshold value once a requisite number of low-power mode conditions are logged. For example, the reconfigurable antenna training control system 132 executing the algorithm may adjust the low-level threshold value upon logging of seven low-power mode conditions. Other values for the requisite number of low-power mode conditions to trigger such an adjustment may be used in other embodiments. In one embodiment in which the low-level threshold value is set to −87 dBm, and the reconfigurable antenna training control system 132 receives an RSSI value of [−45 dBm, −93 dBm], it may omit the RSSI value from consideration by other modules.

In another embodiment in which the low-level threshold value is set to −87 dBm, and the reconfigurable antenna training control system 132 receives an RSSI value of [−45 dBm, −93 dBm], it may adjust the RSSI value to have a value of [−45 dBm, −87 dBm]. The reconfigurable antenna training control system 132 in an embodiment may then identify the adjusted RSSI pair values [−45 dBm, −87 dBm] as valid. In other embodiments, the reconfigurable antenna training control system 132 may exclude from analysis only RSSI pair values in which one of the values in the pair exceeds a high-level threshold value. A fixed value of zero dBm may constitute a fixed high-level threshold value in an embodiment. In such an embodiment, the reconfigurable antenna training control system 132 may determine both of the values in the RSSI pair values falls below the high-level threshold value (e.g. has a value less than 0 dBm), identify those RSSI pair values as valid RSSI values for consideration during later determination of an optimal antenna configuration.

The reconfigurable antenna training control system 132 may further exclude RSSI values for wireless links transceiving in a 2.4 GH frequency band in some embodiments. For example, the reconfigurable antenna training control system 132 in an embodiment may analyze the metrics parameters and valid RSSI values associated with the configuration of interest in order to ensure the wireless link established by such antenna configuration is transmitting in the 5 GHz frequency band, rather than the 2.4 GHz frequency band. The reconfigurable antenna training control system 132 in an example embodiment may perform such a determination based on the modulation scheme and/or data rate of the wireless link established using the configuration of interest. For example, the reconfigurable antenna training control system 132 in such an embodiment may analyze metrics parameters to determine whether the wireless link characterized by such metrics parameters is operating at a legacy data rate, indicating it is transceiving in the 2.4 GHz frequency band. As another example, the reconfigurable antenna training control system 132 may determine if the modulation scheme identified in metrics parameters is only supported by 2.4 GHz frequency band communication (e.g. single input single output (SISO), Direct Sequence Spread Spectrum (DSSS), Frequency-Hopping Spread Spectrum (FHSS)).

In an embodiment, the reconfigurable antenna training control system may determine at block 308 whether signal quality parameters have been gathered for wireless links established using each of the available antenna configurations. For example, if the reconfigurable antenna 202 is capable of achieving four separate configurations, and only one of those configurations has been tested for valid RSSI values over the current training window, the reconfigurable antenna training control system 132 in an embodiment may determine other configurations are available. If the reconfigurable antenna training control system 132 in an embodiment determines other configurations are available, the method may proceed to block 310. If the reconfigurable antenna training control system in an embodiment determines other configurations are not available, this may indicate valid RSSI values and data rate estimates have been identified and gathered or each of the available configurations, and the method may proceed to block 312.

At block 310, in an embodiment in which signal quality parameters have not been gathered for each of the available configurations, the reconfigurable antenna training control system may identify the next available antenna configuration as the next candidate optimal configuration. For example, if four antenna configurations are available, and only the first of these four has been tested for valid RSSI values, the reconfigurable antenna training control system 132 in an embodiment may identify the second of the four available configurations as the configuration of interest. As described herein, each of the available configurations may be stored in a memory accessible by the reconfigurable antenna training control system 132 in an embodiment. Thus, the reconfigurable training control system 132 in such an embodiment may move through the configurations sequentially, as they are stored. The method may then proceed back to block 306. By repeating the loop between blocks 306-308 for each of the available configurations in an embodiment, the reconfigurable antenna training control system 132 may determine and gather valid RSSI values for wireless links established using each of the available configurations over the current training window.

In an embodiment in which signal quality parameters have been gathered for each of the available configurations, the reconfigurable antenna training control system may determine an acquisition mode average signal quality for each of the candidate optimal configurations at block 312. The acquisition mode averaged signal quality in an embodiment may be determined by taking the average of all instantaneous valid RSSI values across the acquisition mode training window of the preset duration. In other embodiments, an average RSSI value may be a median value across the time duration. In still other embodiments, a normalization may be performed across the valid RSSI values in the preset window to achieve a pseudo-uniform RSSI window.

Such determinations may be made for each of the candidate optimal antenna configurations associated with valid RSSI values. Acquisition mode average signal qualities may not be determined, in some embodiments, for candidate configurations associated solely with RSSI values previously excluded at block 306. This may be the case, for example, in an embodiment in which it is determined a candidate configuration is transmitting in the 2.4 GHz frequency band. In other embodiments, for candidate configurations associated with some valid RSSI values and some excluded RSSI values over the acquisition mode training window, the determination of the acquisition mode averaged signal quality may be made based only on the valid RSSI values.

Valid RSSI values in an embodiment may include a plurality of RSSI value pairs (e.g., [−45, −46]), where each value pair represents an instantaneously measured signal quality, and the plurality of pairs includes RSSI value pairs measured across several instances in time over the preset duration of the window. Such a plurality of pairs measured over the preset window duration for a single candidate optimal antenna configuration may be referred to herein as an RSSI chain. The valid RSSI values may further include values for a plurality of RSSI chains, where each chain represents signal quality for a separate available antenna configuration.

In other embodiments, in which the current acquisition mode follows previously executed tracking mode training windows, the reconfigurable antenna training control system may determine a weighted average signal quality parameter at block 312, which accounts for previous performance of wireless links established using each of the candidate configurations during previous training windows. For example, in such an embodiment, the reconfigurable antenna training control system may determine a weighted average signal quality parameter using equation [7] below, based on an iteration weighting variable ($RSSI_{\alpha}$) that varies as the number of prior training windows increases, raw (or validated) RSSI values ($RSSI(i)$) gathered during the current acquisition training window at block 306, and the weighted average signal quality parameter determined during the most recently executed tracking mode training window ($RSSI_{wavg}(i-1)$).

At block 314, the reconfigurable antenna training control system in an embodiment may determine an acquisition mode variance of signal quality parameters for each of the candidate optimal configurations. Variance in an embodiment may describe the magnitude difference between the average signal quality for a candidate configuration determined at block 312 and each of the instantaneous signal quality parameters recorded during the acquisition mode training window. In other words, variance may describe the stability of a wireless signal established using such a candidate configuration. A highly stable signal may be associated with signal quality readings that hover closely to the determined average signal quality, and thus, a low variance. In contrast, a less stable signal may be associated with signal quality readings that stray significantly at times of the acquisition training window from the determined average signal quality, and thus, have a higher variance. An average variance may be determined for each of the candidate configurations in an embodiment at block 314 by determining an instantaneous variance value for each signal quality indicator measured over the acquisition mode training window, then taking an average of all instantaneous variance values for that candidate configuration. In other words, each candidate configuration may be associated with a separate average variance in an embodiment.

In other embodiments, in which the current acquisition mode follows previously executed tracking mode training windows, the reconfigurable antenna training control system may determine a weighted variance at block 312, which accounts for previous performance of wireless links established using each of the candidate configurations during previous training windows. For example, in such an embodiment, the reconfigurable antenna training control system may determine a weighted variance using equation [10] below, based on a variance weighting variable ($VAR_\alpha$) that varies as the number of prior training windows increases, raw variance values ($VAR_{Raw}(i)$) determined using equation [8] based on RSSI values gathered during the current acquisition training window at block 306, and the weighted variance determined during the most recently executed tracking mode training window ($VAR_{wavg}(i-1)$).

The reconfigurable antenna training control system in an embodiment may compare the acquisition mode average signal quality determinations for each of the candidate optimal configurations using a round-robin method at block 316. The acquisition mode average signal quality (e.g. RSSI) values for each configuration, as determined at block 312 in an embodiment may illustrate performance for each wireless link over the acquisition mode training window. The reconfigurable antenna training control system in an embodiment may identify as the optimal configuration the available configuration that resulted in the highest overall average RSSI values. As described herein, a reconfigurable antenna may be set to an acquisition scanning mode when an optimal configuration has yet to be identified. As such, each of the available configurations is equally likely to be identified as the optimal configuration. Thus, when comparing the average RSSI values for each of the available configurations in the acquisition mode, the reconfigurable antenna training control system may compare these values in a round-robin fashion that does not favor any one configuration over another. In a round-robin fashion, the average RSSI value for a given configuration is compared against the average RSSI values of each of the other available configurations in series or in a circular order.

At block 318 in an embodiment, the reconfigurable antenna training control system may identify a candidate configuration having the highest average signal quality over the training window duration as the new locked configuration. For example, in an embodiment described with reference to FIG. 2, the antenna front end module 126 executing code instructions of the reconfigurable antenna training control system in an embodiment may determine an optimal one of the wireless links established during the acquisition training window. The optimal wireless link in such an embodiment may be determined, for example, by identifying the antenna configuration associated with the highest acquisition mode average signal quality parameters (e.g., RSSI).

The reconfigurable antenna training control system may set the antenna to tracking mode in an embodiment at block 320. The mode in which the reconfigurable antenna training control system is operating in an embodiment may impact the duration and frequency of future training windows. The reconfigurable antenna training control system in an embodiment may be placed in the tracking mode when the most recent training window produces a locked configuration, where an optimal wireless link can be clearly distinguished from other links. In contrast, the reconfigurable antenna training control system in an embodiment may be placed in an acquisition mode upon first initialization of the network interface device, or when none of the wireless links established during the most recent training window could be clearly identified as optimal. Thus, in an embodiment in which the optimal configuration is determined at block 318, the method may proceed to block 320 to place the reconfigurable antenna in the tracking mode.

The reconfigurable antenna training control system in an embodiment may determine an optimal duration of the next training window at block 322. As described herein, the reconfigurable antenna training control system in embodiments may use a non-dedicated training method, which may involve sampling of the signal quality parameters for each of the plurality of candidate optimal antenna patterns/configurations occurring simultaneously with the transmission or receipt of content data according to usual operation of the information handling system. Use of such a non-dedicated training method may cause a fluctuation in the quality of the signal transceived during the training session as different antenna configurations are tested, and thus a need to limit the duration of the training period in which the mobile information handling system communication signals experience suboptimal quality. However, there is also a competing need to extend such a training period long enough to ensure that sufficient signal quality measurements for each available antenna configuration can be gathered to determine which of these candidate configurations is most optimal in the current operational and environmental conditions.

The reconfigurable antenna training control system in an embodiment may determine the optimal duration of the next training window on a configuration by configuration basis in order to balance these competing needs. For example, the reconfigurable antenna training control system may dedicate more time in the next training window (e.g., extend the duration of the next training window) to testing signal quality parameters of the candidate configuration identified at block 318 as optimal. This may ensure that more resources are dedicated toward testing of wireless links known to provide better performance than toward testing of known lower performing configurations for wireless links.

The optimal duration of the next training window for a given available configuration immediately following an acquisition mode training window in an embodiment may be determined based on comparisons between acquisition mode average RSSI values for each of the available configurations and on acquisition mode variance values averaged across all configurations. For example, the reconfigurable antenna training control system in an embodiment may determine an absolute value for the differences between the acquisition mode average RSSI values for each of the candidate configurations. The reconfigurable antenna training control system in an embodiment may then determine the standard deviation of the average RSSI values for each of the candidate configurations from this smallest pair-wise difference using the equation:

$$\sigma_{ACQ} = \frac{PWD_{MIN}}{\sqrt{2}\{f^{-1}[1-(2CR)]\}} \quad [1]$$

where $PWD_{MIN}$ is the minimum pair-wise difference between the acquisition mode average RSSI values for each of the candidate configurations, $f^{-1}$ indicates the inverse Gaussian function, and CR represents a confidence region variable having a value between zero and one. The confidence region variable in an embodiment may set the upper tail of the combined distribution curve describing $PWD_{MIN}$. For example, a confidence region variable of 0.05 may be used to set the upper tail of the combined distribution to 95%. In such a way, the reconfigurable antenna training control system may cause all values of the normalized distribution of $PWD_{MIN}$ for each of the candidate configurations to fall within 5% of one another. The confidence region variable CR in an embodiment may be preset.

The reconfigurable antenna training control system in an embodiment may then determine an optimal duration for the next training window for each configuration based on the standard deviation described with reference to equation [1], identification of the configuration as locked or candidate, and the current mode of the reconfigurable antenna training control system. In an embodiment in which the reconfigurable antenna training control system is currently set to the tracking mode, the reconfigurable antenna training control system may dedicate more time toward testing signal quality for the wireless link established using the configuration identified at block 318 as locked than toward similar testing for the remaining "candidate" configurations. For example, the reconfigurable antenna training control system may determine the duration of the next training window for the configuration identified as block 318 as locked in such an embodiment using the following equation, rounded to the nearest integer value:

$$WL_{Locked}(i+1) = \frac{3*AVG\_VAR(i)}{\sigma^2_{ACQ}} \quad [2]$$

where AVG_VAR(i) is an average of all variance values for each of the available configurations (including both locked and candidate) determined across the acquisition window at block 314. As another example, the reconfigurable antenna training control system in an embodiment may determine an optimal duration of the next training window ($WL_{Candidate}$(i+1)) for all other available configurations ("candidate configurations") using the following equation, rounded to the nearest integer value:

$$WL_{Candidate}(i+1) = \frac{3*AVG\_VAR(i)}{2*\sigma^2_{ACQ}} \quad [3]$$

In some embodiments, the reconfigurable antenna training control system may limit the duration of a training window to a preset minimum duration and/or a preset maximum duration. For example, the reconfigurable antenna training control system may apply a preset minimum duration or four milliseconds and/or a preset maximum duration of 300 milliseconds. Other preset durations are also contemplated in other embodiments, and four ms and 300 ms are only example values. In an embodiment, the reconfigurable antenna training control system may set the window length to the minimum preset value if the window length of any given training window (in either acquisition mode or tracking mode), as determined using equations [8]-[10], falls below the minimum preset value. The reconfigurable antenna training control system in an embodiment may similarly set the window length to the maximum preset value if the window length of any given training window (in either acquisition mode or tracking mode), as determined using equations [8]-[10], exceeds the maximum preset value. Additional description of equations [8]-[10] is discussed below with respect to FIG. 5.

In other embodiments, the preset maximum value and preset minimum values described directly above may be adjustable, based on the number of previously executed training windows. For example, an adjustable preset maximum value for the duration of a training window may be determined for each new window by multiplying an initial preset maximum value by a maximum adjustment factor that increases as the number of previously executed training windows increases. Such a maximum adjustment factor in an embodiment may be determined using the equation:

$$ADJ_{MAX} = 2*INIT_{MAX} \quad [4]$$

where $ADJ_{MAX}$ is the maximum adjustment factor, and $INIT_{MAX}$ is the initial preset maximum value (e.g. 300 ms). As another example, an adjustable preset minimum value for the duration of a training window may be determined for each new window based on a multiplication of an initial preset minimum value by a minimum adjustment factor that increases as the number of previously executed training windows increases. Such a minimum adjustment factor in an embodiment may be determined using the equation:

$$ADJ_{MIN} = \frac{1}{2*INIT_{MIN}} \quad [5]$$

where $ADJ_{MIN}$ is the minimum adjustment factor, and $INIT_{MIN}$ is the initial preset minimum value (e.g. 4 ms). In such a way, the maximum adjustment factor may increase and the minimum adjustment factor may decrease as the number of previously executed training windows increases. In such a way, the reconfigurable antenna training control system in an embodiment may tailor the duration of each newly iterated training window to the past performance and stability of each individual configuration, as well as to the duration of the training session over a plurality of training windows.

At block 324, the reconfigurable antenna training control system may transmit a control instruction to the antenna systems to place the reconfigurable antenna in the locked configuration. For example, once an optimal wireless link has been identified, the antenna front end module 126 executing the reconfigurable antenna training control system 132 may transmit machine readable executable code instructions to place the antenna in the optimal configuration determined at block 318 to the reconfigurable antenna. In some embodiments, such code instructions may control one or more multiplexing circuits directing current toward a specific set of antenna elements as dictated by the identified optimal configuration. In other embodiments, the machine readable executable code instructions may be transmitted to a controller within the antenna systems or operably connected to the reconfigurable antenna capable of reconfiguring the plurality of antenna elements to generate the identified optimal antenna pattern/configuration.

In some embodiments, the reconfigurable antenna training control system may also track the frequency with which new optimal configurations are identified in order to gauge stability of established wireless links. The frequency of such changes may increase in an embodiment where signal quality conditions for established wireless links are changing rapidly. This may indicate a high-traffic area in which the wireless network adaptor is encountering higher than average interference. Thus, the reconfigurable antenna training control system in an embodiment may respond to each change in the designated optimal configuration by increasing the gain of the reconfigurable antenna by an incremental value to overcome higher interference. In contrast, each time a training session results in no change of the optimal configuration, the reconfigurable antenna training control system in an embodiment may decrease the gain of the reconfigurable antenna by an incremental value. In an example embodiment, such an incremental increase may be a 5% value, and such an incremental decrease may be a 50% value. Other incremental increase and decrease values are also contemplated in other embodiments.

Figure 4:
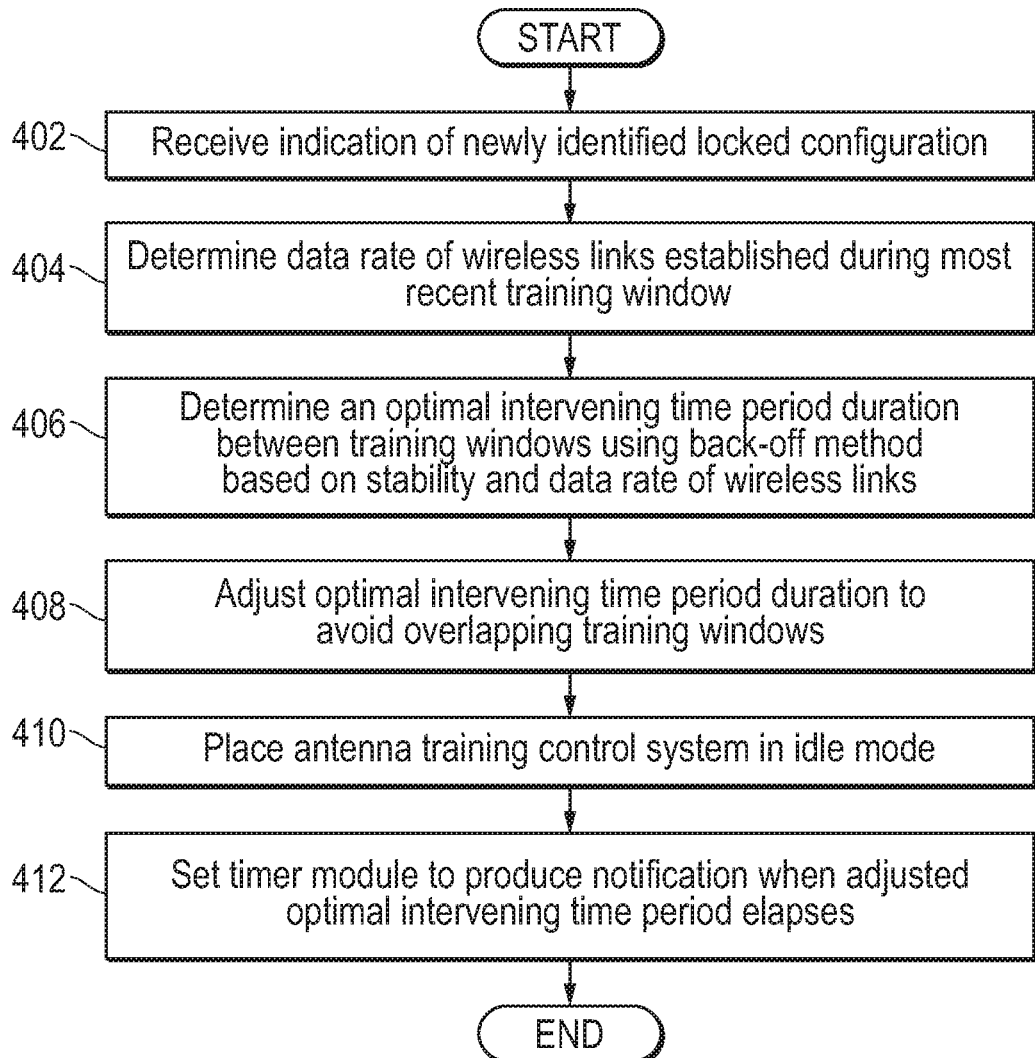
FIG. 4 is a flow diagram illustrating a method of determining an optimal frequency of antenna training sessions according to an embodiment of the present disclosure.

FIG. 4 is a flow diagram illustrating a method of determining an optimal frequency of antenna training sessions based on data rate and stability of a wireless link established while the reconfigurable antenna is in an optimal configuration according to an embodiment of the present disclosure. As described herein, the reconfigurable antenna training control system in an embodiment may use a non-dedicated training method, which may involve sampling of signal quality parameters for several different antenna configurations simultaneous with transmission or receipt of content data according to usual operation of the information handling system. Use of such a non-dedicated training method in some embodiments may allow users to continue to transceive all content data during the training session, but could also cause a fluctuation in the quality of the signal transceived during the training session as different antenna configurations are tested. Because the quality of signals may fluctuate while the mobile information handling system attempts to communicate via those signals, when implementing the non-dedicated training system, there is a need to limit the duration and frequency of the training period, and thus limit the time period in which the mobile information handling system communication signals experience suboptimal quality. However, there is also a competing need for training session duration and frequency adequate to ensure that sufficient signal quality measurements for each available antenna configuration can be gathered to determine which of these antenna configurations is most optimal in the current operational and environmental conditions. The reconfigurable antenna training control system in an embodiment may use the method described with reference to FIG. 4 to determine such an optimal frequency of testing.

Although the embodiments of FIG. 4 describe the method and operation of the reconfigurable antenna training control system with respect to the RSSI performance metric, as with all other embodiments discussed herein, it is contemplated that several wireless performance metrics may be used. The wireless performance metrics may include RSSI, data rate, lost packets, bit error rates, signal to noise ratios, latencies, jitter, and other metrics relating to signal quality and strength. Other of these performance metrics may be used in place of RSSI in the method of FIG. 4 in some embodiments. In other embodiments, it is contemplated that multiple performance metrics may be utilized with the embodiments herein including that if FIG. 4. Those of skill in the art will understand modifications to the methods described herein to utilize these other or additional performance metrics.

The reconfigurable antenna training control system in an embodiment may receive an indication of a newly identified locked configuration at block 402. For example, in an embodiment described with reference to FIG. 3 above, upon identification of a locked configuration at block 324, subsequent to an acquisition mode training window, a control instruction may be transmitted to place the reconfigurable antenna in the locked configuration. Similarly, in an embodiment described with reference to FIG. 5 below, the reconfigurable antenna training control system in an embodiment may transmit an instruction at block 520 indicating a new locked configuration has been identified, subsequent to a tracking mode training window. The transmission of either of these signals in an embodiment may cause the reconfigurable antenna training control system to register identification of a new locked configuration.

At block 404, the reconfigurable antenna training control system may determine a data rate of wireless links established during the most recent training window in an embodiment. As described herein, the feedback parameters gathered by the radio frequency subsystems 134 for each of the available configurations during each training window in an embodiment may be stored in a memory accessible by the antenna front end 126. Such stored metrics parameters may include a number of transmitted/received bytes and a duration of transmission/reception in an embodiment. By dividing the number of transmitted/received bytes by the duration of such transmission/reception for wireless links established using each of the available antenna configurations in an embodiment, the reconfigurable antenna training control system may determine data rates for each available configuration during the most recently executed training window.

The reconfigurable antenna training control system in an embodiment may determine timer instructions using a back-off method based on stability and data rate of the wireless link established using the new locked configuration at block 406. The reconfigurable antenna training control system may further execute a back-off method to control the frequency of training sessions in an embodiment. For example, such a back-off method may be used to determine an optimal duration of time in between consecutive training windows. The duration of intervening periods between training windows may be set by the back-off method based on stability of established wireless links and/or data activity of those links. The back-off method may initially set the duration of intervening time to a default value that may be adjusted incrementally upward or downward in an embodiment. For example, the duration of intervening time in an embodiment may have a default value of 100 ms. As another aspect of such an embodiment, each adjustment may include an incremental increase of 200 ms, or an incremental decrease of 500 ms. These are example values, and other default and incremental adjustment values are also contemplated.

The back-off method may gauge stability of established wireless links based on the frequency with which the antenna systems shift from acquisition mode to tracking mode, or from one locked configuration to another locked configuration, as measured by the frequency at which the antenna systems receive instructions to change the reconfigurable antenna configuration. The frequency at which the antenna systems receive such instructions may increase as the signal conditions for established wireless links varies, indicating a decrease in signal stability. More frequent training sessions may be needed in order to account for rapidly changing conditions in such embodiments.

As another example, the back-off method in an embodiment may gauge data activity based on the estimated bandwidth. As the estimated bandwidth increases, the need for higher quality wireless links may also increase. In contrast, very low bandwidth estimates may indicate lower utility of wireless links, and a decreased instantaneous need for higher quality wireless links.

In an embodiment, the back-off method in an embodiment may adjust the length of the intervening time based on these above considerations by increasing or decreasing the length incrementally. For example, the back-off method may increase the duration of intervening time by a single increment each time a new locked configuration is identified in an embodiment. In contrast, the back-off method may decrease the duration of intervening time by a single decrement each time a training session does not result in identification of a new optimal configuration. In some embodiments, the back-off method may continue to enact such incremental increases or decreases so long as the duration of intervening time stays above a minimum threshold value (e.g. 10 ms) or below a maximum threshold value (e.g. 5 min). These are only two example timer threshold values, and other values are also contemplated.

Further, the back-off method may set the intervening time duration to zero (resulting in concurrent or back-to-back training sessions) when the estimated bandwidth meets a threshold activity level value, or when the reconfigurable antenna training control system shifts from a tracking mode to an acquisition mode. For example, in an embodiment in which the estimated bandwidth meets or exceeds a threshold activity level of 100 kbit/s, the back-off method may set the intervening time duration to zero. The threshold activity level may vary in other embodiments (e.g., 50 kbit/s, 200 kbit/s, 400 kbit/s). In another embodiment, the back-off method may receive a plurality of bandwidth estimates, each determined over a different time period. If any of the plurality of bandwidth estimates in such an embodiment meets or exceeds a threshold activity level, the back-off method may set the intervening time duration to zero.

In yet another embodiment, the back-off method may set the intervening time duration to zero only if each of the plurality of bandwidth estimates (or a preset number of the plurality of bandwidth estimates) meets or exceeds such a threshold activity level. In still other embodiments, the threshold activity level may vary for each time period over which the plurality of bandwidth estimates are determined. For example, the bandwidth may be estimated across a three second time period, a thirty second time period, and a three-hundred second time period. In such an embodiment, the threshold activity level for the three second time period may be 266 kbit/s, the threshold activity level for the thirty second time period may be 5.33 kbit/s, and the threshold activity level for the three hundred second time period may be 53.3 bit/s.

At block 408, the reconfigurable antenna training control system in an embodiment may determine a timer delay instruction to avoid overlapping training windows. The reconfigurable antenna training control system in an embodiment may increase or decrease the duration of the intervening time as dictated by the back-off method. Increasing the frequency of training windows (e.g., by decreasing the duration of the intervening time) in an embodiment may allow the reconfigurable antenna training control system to more quickly respond to changes in channel quality conditions. However, if the windows are sufficiently frequent that they overlap one another, the reconfigurable antenna training control system may unnecessarily expend computing resources on duplicated tasks. For example, if two learning windows overlap, the first window may record RSSI values also recorded in the second window. Determination by the reconfigurable antenna training control system of an optimal antenna configuration based on such duplicate RSSI reporting may similarly result in use of computing resources for unnecessarily repetitious tasks.

The reconfigurable antenna training control system in an embodiment may increase or decrease the frequency of training windows by multiplying the duration of intervening time by a factor (K). The reconfigurable antenna training control system in some embodiments may multiply the intervening time determined by the back-off algorithm by a factor K having a value less than one to increase the frequency of learning windows under certain preset circumstances. For example, the reconfigurable antenna training control system may increase the frequency of learning windows when the combined number of bytes both transmitted and received over a preset time period meets or exceeds a preset traffic threshold value. An example preset traffic threshold in such an embodiment may be 1000 kbytes over a preset time period of 50 ms, yielding an equivalent data rate of 400 kbit/s. In such an embodiment, the reconfigurable antenna training control system may multiply the duration of intervening time determined by the back-off method by the factor 0.5, thus causing the learning windows to occur twice as often. These are only example values of the preset time period, preset traffic threshold value, and resultant factor (K).

In other aspects of an embodiment, the reconfigurable antenna training control system may multiply the duration of intervening time determined using the back-off method by a factor K having a value greater than one to decrease the frequency of learning windows. For example, the reconfigurable antenna training control system may decrease the frequency of learning windows when no data is received across a percentage of the frames in a training window meeting a preset idle threshold value. Such a preset idle threshold value may be, for example, 80% of all frames in the most recent learning window. Other embodiments may use other preset values for the preset idle threshold value. In such an example embodiment, the reconfigurable antenna training control system may multiply the duration of intervening time determined using the back-off method by a factor of two when no data is received across 80% of all frames in the most recent learning window. In still other embodiments, the reconfigurable antenna training control system may only decrease the frequency of learning windows in such a way if no data is received during a preset consecutive number of frames in the most recent learning window, or based upon transmitted data rates (in addition to or instead of received data rates) during the most recent learning window.

The reconfigurable antenna training control system in an embodiment may enter an idle mode at block 410. During the idle state, the reconfigurable antenna training control system may not transmit instructions to the antenna systems to change the configuration of the reconfigurable antenna. Further, the radio frequency subsystems may not test the signal quality or bandwidth of wireless links established or in operation during the idle period. Rather, during such an idle period between training windows, all bandwidth for established and operating wireless links may be dedicated entirely to transceiving content data pursuant to normal operation of the information handling system.

In an embodiment, the reconfigurable antenna training control system may set a timer at block 412 to provide an indication of elapsed time after the adjusted optimal intervening time period elapses. Upon entering the idle state in an embodiment, the reconfigurable antenna training control system may initiate a timer having the duration of the optimal adjusted intervening time determined by the back-off algorithm at block 406 and adjusted at block 408. The optimal adjusted intervening time in such an embodiment may be optimized by the reconfigurable antenna control system to balance the competing need to limit the time period in which the mobile information handling system communication signals experience suboptimal quality, and the need for training session duration and frequency adequate to gather signal quality measurements for each available antenna configuration sufficient to determine which of these antenna configurations is most optimal in the current operational and environmental conditions. Once the adjusted optimal intervening time period elapses, in an embodiment, the notification produced by the timer may trigger a new training window.

Figure 5:
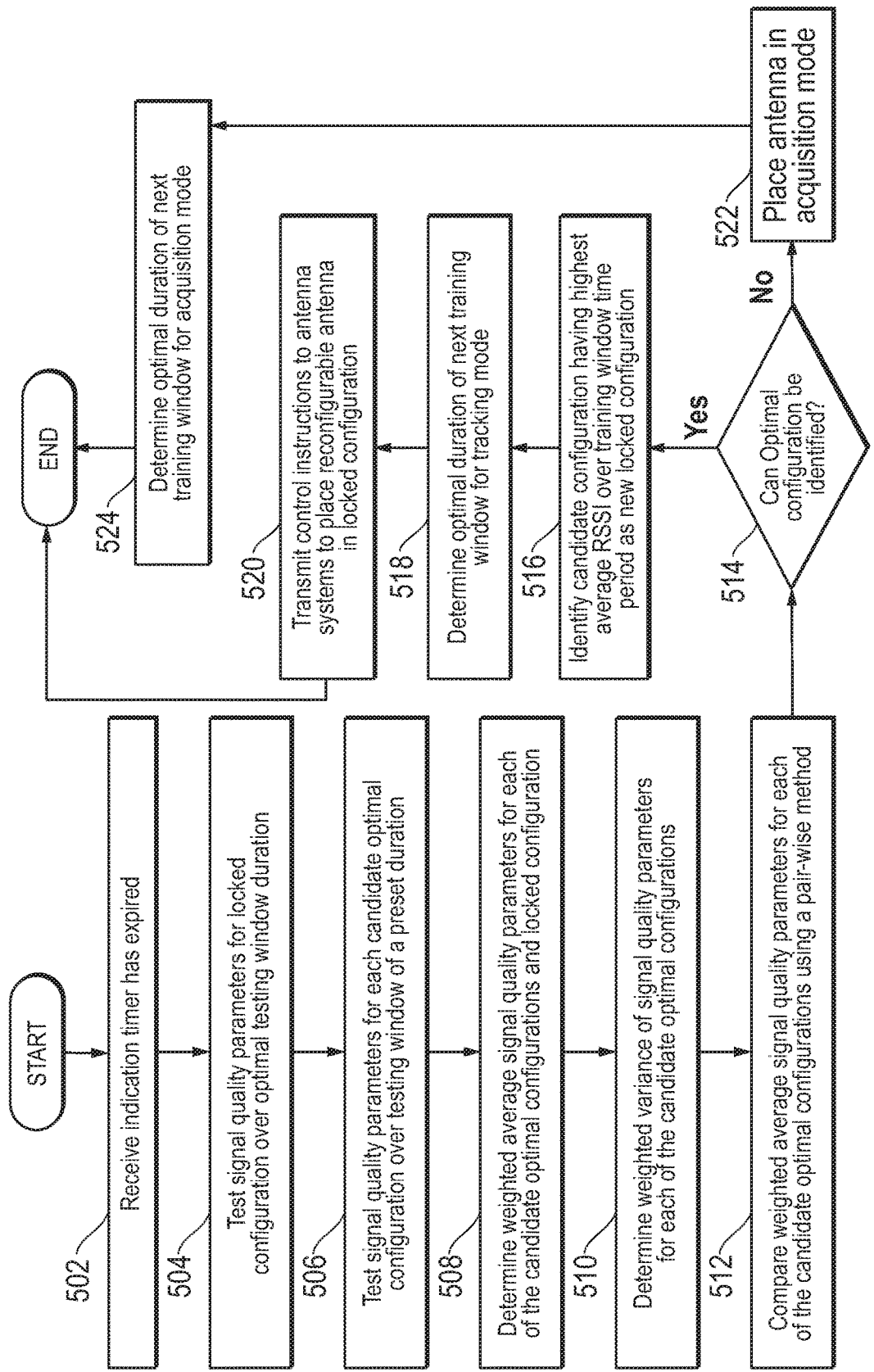
FIG. 5 is a flow diagram illustrating a method of identifying an optimal antenna configuration in a tracking mode according to an embodiment of the present disclosure.

FIG. 5 is a flow diagram illustrating a method of identifying an optimal antenna configuration based on signal quality parameters gathered for each available configuration in a tracking mode according to an embodiment of the present disclosure. As with FIG. 3 and FIG. 4, the embodiments of FIG. 5 describe the method and operation of the reconfigurable antenna training control system with respect to the RSSI performance metric. As with all other embodiments discussed herein, it is contemplated that several wireless performance metrics may be used with the embodiments of FIG. 5. The wireless performance metrics may include RSSI, data rate, lost packets, bit error rates, signal to noise ratios, latencies, jitter, and other metrics relating to signal quality and strength. Other of these performance metrics may be used in place of RSSI in the method of FIG. 5 in some embodiments. In other embodiments, it is contemplated that multiple performance metrics may be utilized with the embodiments herein including that if FIG. 5. Those of skill in the art will understand modifications to the methods described herein to utilize these other or additional performance metrics.

As described herein, the reconfigurable antenna training control system in an embodiment may be placed in a tracking mode once an optimal configuration is identified based upon previous training windows. Thus, upon entering a tracking mode training window, the reconfigurable antenna training control system in an embodiment may have already identified a current locked configuration that has been determined to be optimal based on the most recently executed training window (which may have been performed in either tracking mode or acquisition mode). All available antenna configurations other than the current locked configuration may be considered "candidate" optimal configurations during the tracking mode training window while the method described in FIG. 5 may occur.

At block 502, the reconfigurable antenna training control system in an embodiment may receive an indication that the timer has expired. As described herein, a notification may be produced by a timer to trigger a new training window when the reconfigurable antenna training control system has been placed in an idle mode for an optimal adjusted intervening time. Such an optimal adjusted intervening time in such an embodiment may be optimized to balance the competing need to limit the time period in which the mobile information handling system communication signals experience suboptimal quality, and the need for training session duration and frequency adequate to gather signal quality measurements for each available antenna configuration sufficient to determine which of these antenna configurations is most optimal in the current operational and environmental conditions.

The reconfigurable antenna training control system in an embodiment may test the signal quality parameters for the locked configuration over the optimal testing window duration at block 504. For example, in an embodiment described with reference to FIG. 2, the reconfigurable antenna training control system 132 in an embodiment may retrieve one or more signal quality metrics parameters of a wireless link established using the currently identified locked configuration. Such signal quality metrics parameters may be recorded by the radio frequency subsystems 134, stored in a memory accessible by the antenna front end 126, and associated with the Basic Service Set Identifier (BSSID) of the network with which the network interface device 120 is communicating via the wireless link established using the locked configuration.

As one example, in an embodiment described with reference to FIG. 3, the reconfigurable antenna training control system may retrieve stored RSSI values for a wireless link established using the new locked configuration identified at block 318 over the current tracking mode training window having the optimal duration $WL_{Locked}$ for the locked configuration determined at block 322 using equation [2] and potentially adjusted using equations [4] and/or [5]. In some embodiments, the reconfigurable antenna training control system may exclude RSSI values falling below an adjustable low-level limit, exceeding a preset and fixed high-level limit, or associated with wireless links transceiving in legacy frequency bands (e.g., 2.4 GHz) in an embodiment, as described with reference to FIG. 3.

The reconfigurable antenna training control system in an embodiment may test signal quality parameters for each of the candidate optimal configurations over a testing window of a preset duration at block 506. For example, in an embodiment described with reference to FIG. 2, the reconfigurable antenna training control system 132 in an embodiment may transmit instructions to the antenna systems 130 to place the reconfigurable antenna 202 in a first configuration, and to transceive data while in that configuration over a previously determined optimal duration for the current training window. Upon completion of the current tracking mode training window for the first configuration, the reconfigurable antenna training control system 132 in such an embodiment may then transmit instructions to the antenna systems 130 to place the reconfigurable antenna 202 in the next available configuration, and to transceive data over another tracking mode training window of predetermined optimal duration. During each of these training windows, the radio frequency subsystems 134 in an embodiment may gather the feedback parameters, store the metrics parameters in a memory accessible by the antenna front end 126, and associate the metrics parameters with the BSSID of the network with which the network interface device 120 is communicating via the wireless link established using each of the candidate configurations. The network interface device 120 in such an embodiment may communicate with the same network (having a single BSSID) when testing the locked configuration as it is when testing each of the candidate configurations. Thus, RSSI values gathered and stored across each of the configurations for the tracking mode training window described with reference to blocks 504-506 may be associated with a single BSSID.

The optimal duration for such tracking mode training windows in an embodiment may be equivalent for each of the candidate configurations. For example, in an embodiment described with reference to FIG. 3, the reconfigurable antenna training control system may instruct the radio frequency subsystem to gather and store RSSI values for each candidate configuration over an optimal duration $WL_{Candidate}$ for the candidate configurations determined at block 322 using equation [3] and potentially adjusted using equations [4] and/or [5]. The optimal duration of the training window for testing the locked configuration may be greater than the optimal duration of the training window for testing each of the candidate configuration in an embodiment.

At block 508, the reconfigurable antenna training control system may determine a weighted average signal quality for each of the candidate optimal configurations and the locked configuration. The weighted average signal quality for each configuration in such an embodiment may be determined based on all valid RSSI values across a current training window, in combination with weighted average RSSI values determined across previous training windows. The degree to which such a determination depends on the valid RSSI values across the current training window, rather than on the previous window weighted average, may vary based on the number of previously executed training windows.

The number of previously executed training windows may be determined in an embodiment according to the number of BSSIDs that are associated with separate datasets stored in memory accessible by the reconfigurable antenna training control system. For example, in an embodiment described with reference to FIG. 3, the feedback parameters gathered during the acquisition mode training window at block 306 for each of the available configurations may be associated with the BSSID of the WLAN with which the network interface device is communicating during the acquisition mode training window. As another example, RSSI values gathered and stored across each of the configurations for the tracking mode training window described with reference to blocks 504-506 may be associated with a single BSSID. In other words, if one acquisition mode training window (e.g., described with respect to FIG. 3) and one tracking mode training window (e.g., described with respect to FIG. 5) have been executed, where parameters recorded during each window is associated with a separate BSSID, the reconfigurable antenna training control system may determine that two previous training windows have occurred. In other embodiments, the reconfigurable antenna training control system may employ a counter variable that increments each time a new training window (either acquisition or tracking) occurs.

The degree to which the reconfigurable antenna training control system in an embodiment places more emphasis on past performance rather than current performance (e.g., in the most recent training window) may depend upon the number of training windows that have already been executed. For example, the reconfigurable antenna training control system in an embodiment may determine iteration weighting variable ($RSSI_\alpha$) that varies as the number of prior training windows increases, using the equation:

$$RSSI_\alpha = \frac{1}{win_{cntr}} \quad [6]$$

The variable $win_{cntr}$ in such an embodiment may describe the number of previous iterations of training windows. Thus, as the number of previously executed training windows increases, the value of the variable $win_{cntr}$ increases, causing the value of the iteration weighting variable ($RSSI_\alpha$) to decrease.

The reconfigurable antenna training control system may then determine a weighted average signal quality parameter for a given available configuration (e.g. locked or candidate) based on the iteration weighting variable ($RSSI_\alpha$), the measured RSSI values for the given available configuration, and the averaged signal quality parameter for that given available configuration as determined over the most recent training window using the formula:

$$RSSI_{wavg}(i)=[RSSI_\alpha*RSSI(i)]+[(1-RSSI_\alpha)*RSSI_{wavg}(i-1)] \quad [7]$$

where $RSSI_{wavg}(i)$ is the weighted average signal quality parameter for the current tracking mode training window, RSSI(i) is a raw (or validated) RSSI value measured during the current tracking mode training window, and $RSSI_{wavg}(i-1)$ is the weighted average signal quality parameter for the most recently executed previous training window. For example, in an embodiment described with reference to FIG. 3, $RSSI_{wavg}(i-1)$ may be the weighted average signal quality parameter for the acquisition mode training window, as determined at block 312. As described above, as the number of training previously executed windows increases, the iteration weighting variable ($RSSI_\alpha$) decreases, causing the reconfigurable antenna training control system in an embodiment to place greater emphasis on previous performance metrics as training progresses. This equation may be used to determine the weighted average signal quality parameter for the current locked configuration, as well as for each of the candidate configurations.

At block 510, the reconfigurable antenna training control system in an embodiment may determine a weighted variance of signal quality parameters for each of the candidate optimal configurations. Variance in an embodiment may describe the stability of a wireless signal established using the locked configuration or using any of the candidate configurations. A highly stable signal may be associated with raw (or validated) signal quality parameters that hover closely to the determined weighted average signal quality parameter, and thus, a low variance. In contrast, a less stable signal may be associated with raw (or validated) signal quality parameters that stray significantly at times of the acquisition training window from the determined weighted average signal quality parameter, and thus, have a higher variance.

Each of the candidate configurations and the locked configuration may be associated with a separate average variance in an embodiment. The average variance in an embodiment may be determined based on a raw variance for each of the configurations. For example, the raw variance of any given configuration in an embodiment may be determined using the equation:

$$VAR_{Raw}(i)=|RSSI_{wavg}(i)-RSSI(i)| \quad [8]$$

where $VAR_{Raw}(i)$ is the raw variance of the given configuration over the current tracking mode training window. The reconfigurable antenna training control system in an embodiment may determine a variance of each of the candidate configurations and the locked configuration using this equation.

Similarly to the way in which the average signal quality indicator is weighted based on past performance, as further training windows are executed, the reconfigurable antenna training control system in an embodiment may also determine a weighted variance for each configuration to account for past performance. For example, the reconfigurable antenna training control system in an embodiment may determine a variance weighting variable ($VAR_\alpha$) that varies as the number of prior training windows increases, using the equation:

$$VAR_\alpha = \frac{1}{maxwin_{cntr}} \quad [9]$$

The variable $maxwin_{cntr}$ in such an embodiment may describe a value equivalent to either one, or the number of previous iterations of training windows minus one, whichever is greater. For example, the variable $maxwin_{cntr}$ may be equivalent to the minimum value of one during an initial acquisition mode immediately following initialization of the antenna front end, and during the first tracking mode training window. In future training windows, the variable $maxwin_{cntr}$ may increase by an integer of one each time a training window ends in an embodiment. Thus, as the number of previous windows increases, the value of the variable $maxwin_{cntr}$ increases, causing the value of the variance weighting variable ($VAR_\alpha$) to decrease.

The variance weighting variable may then be applied to a variance determination in a given training window to determine a weighted variance that accounts for stability measured in previous training windows. For example, the reconfigurable antenna training control system in an embodiment may determine a weighted variance for a given antenna configuration using the equation:

$$VAR_{wavg}(i) = \{VAR_\alpha * [VAR_{Raw}(i)]^2\} + [(1-VAR_\alpha) \\ * VAR_{wavg}(i-1)] \quad [10]$$

where $VAR_{wavg}(i)$ is the weighted variance for a given antenna configuration during the current tracking mode training window, $VAR_{Raw}(i)$ is the raw variance for the given configuration over the current tracking mode training window as determined using equation [9], and $VAR_{wavg}(i-1)$ is the weighted variance for the given antenna configuration during the most recently executed training window (either in acquisition mode or tracking mode). As described above, as the number of training windows already executed increases, the variance weighting variable ($VAR_\alpha$) decreases, causing the reconfigurable antenna training control system in an embodiment to place greater emphasis on previous performance metrics as training progresses. Thus, as the number of training windows increases, the reconfigurable antenna training control system in an embodiment may place a greater degree of emphasis on past stability of a given configuration when determining a weighted stability ($VAR_{wavg}$) for that configuration.

The reconfigurable antenna training control system in an embodiment may compare the weighted average signal quality parameters for each of the candidate optimal configurations using a pair-wise method at block 512. As described herein, upon entering the tracking mode training window in an embodiment, the reconfigurable antenna training control system has already identified an optimal, locked configuration, and all other available configurations are considered candidate optimal configurations. Thus, in order to identify one of the candidate configurations as more optimal than the currently locked configuration, that candidate configuration must exhibit better performance than the currently locked configuration. As such, when placed in a tracking mode, the reconfigurable antenna training control system in an embodiment may identify a new optimal configuration by comparing the weighted average RSSI values of each of the candidate configurations to the locked configuration in a pair-wise fashion. Comparison of weighted average RSSI values between any two candidate configurations, however, may not be necessary in such a pair-wise comparison method in some embodiments.

At block 514, the reconfigurable antenna training control system in an embodiment may determine whether an optimal configuration can be identified. As described herein, the reconfigurable antenna training control system in an embodiment may identify a given configuration as the optimal, new locked configuration when the weighted average signal quality parameter for that configuration is greater than the weighted average signal quality parameters for all other candidate configurations (when in acquisition mode) or for the currently locked configuration (when in tracking mode), as measured across a single training window. In other embodiments, the reconfigurable antenna training control system may only identify a new locked configuration if that configuration consistently exhibits higher weighted average signal quality parameters across a plurality of consecutive training windows. For example, the reconfigurable antenna training control system may identify a new locked configuration only if that configuration produces a weighted average signal quality parameter greater than that of the currently locked configuration across a minimum number or percentage of consecutive windows (e.g. across two out of five consecutive windows). In an embodiment in which a new locked configuration cannot be identified (e.g., for failure to consistently out perform the current locked configuration across a plurality of training windows), the method may proceed to block 522. In an embodiment in which a new locked configuration can be identified (e.g., by consistently out performing the current locked configuration across the minimum number of percentage of consecutive training windows), the method may proceed to block 516.

The reconfigurable antenna training control system in an embodiment in which an optimal configuration can be identified may identify the candidate or currently locked configuration having the highest average RSSI over the training window as the new locked configuration at block 516. For example, when a configuration is identified as optimal across a minimum number of windows (e.g., across two out of five consecutive windows), that configuration may be identified as the new locked configuration. A configuration may be identified as "optimal" in such an embodiment when the weighted average signal quality parameter determined for that configuration (e.g. using equation [7] above) is greater than the weighted average signal quality parameter for the currently locked configuration.

At block 518, the reconfigurable antenna training control system in an embodiment may determine the optimal duration of the next training window for the tracking mode. The optimal duration for the next training window for a given available configuration may be determined in an embodiment based on comparisons between weighted average signal quality parameters for each of the available configurations and on weighted variances averaged across all configurations. For example, the reconfigurable antenna training control system in an embodiment may determine a performance comparison variable ($\Delta wavg(i)$) that describes the difference in performance metrics of the two available configurations used to establish the two wireless links having the highest weighted average signal quality parameters using the equation:

$$\Delta \text{wavg}(i) = \text{RSSI}_{wavg}^{LC1}(i) - \text{RSSI}_{wavg}^{LC2}(i) \qquad [11]$$

where $\text{RSSI}_{wavg}^{LC1}(i)$ is the weighted average signal quality parameter determined over the current tracking mode training window for the configuration identified as locked at the beginning of the method described by FIG. 5, and $\text{RSSI}_{wavg}^{LC2}(i)$ is the weighted average signal quality parameter determined over the current tracking mode training window for the configuration identified as locked at block 516. The reconfigurable antenna training control system may determine future tracking mode training window durations for each of the candidate optimal antenna configurations, and for the configuration identified at block 516 as the locked configuration in an embodiment, based on a standard deviation of the performance comparison variable $\Delta$wavg.

The reconfigurable antenna training control system in an embodiment may determine the standard deviation of the performance comparison variable across all available configurations using the equation:

$$\sigma_{TRA}(i) = \frac{\Delta wavg(i)}{\sqrt{2}\, \{f^{-1}[1-(2CR)]\}} \qquad [12]$$

where $f^{-1}$ indicates the inverse Gaussian function, and CR represents the confidence region variable having a value between zero and one.

The reconfigurable antenna training control system in an embodiment may then determine an optimal duration for the next tracking mode training window for each configuration based on the standard deviation of the performance comparison variable, and identification of the configuration as locked or candidate. The reconfigurable antenna training control system may set the duration of the next tracking mode training window for the configuration identified at block 516 as locked to be longer than the duration of the next tracking mode training windows for the candidate configurations. For example, the reconfigurable antenna training control system may determine the duration of the next tracking mode training window ($WL_{Locked}(i+1)$) for the configuration identified at block 516 as locked in such an embodiment using the following equation, rounded to the nearest integer value:

$$WL_{Locked}(i+1) = \frac{3 * \text{AVG\_VAR}(i)}{\sigma_{TRA}^2(i)} \qquad [13]$$

where AVG_VAR(i) is an average of all variance values for each of the available configurations (including both locked and candidate) determined at block 512. As another example, the reconfigurable antenna training control system in an embodiment may determine a duration of the next tracking mode training window for each of the candidate configurations ($WL_{Candidate}(i+1)$) using the following equation, rounded to the nearest integer value:

$$WL_{Candidate}(i+1) = \frac{3 * \text{AVG\_VAR}(i)}{2 * \sigma_{TRA}^2(i)} \qquad [14]$$

The durations of tracking mode windows for each antenna configurations may be stored as necessary for use with the next set of tracking mode window assessments.

The reconfigurable antenna training control system in an embodiment may transmit control instructions to the antenna systems to place the reconfigurable antenna in the new locked configuration at block 520. For example, once an optimal wireless link has been identified, the antenna front end module 126 executing the reconfigurable antenna training control system 132 may transmit machine readable executable code instructions to place the antenna in the optimal configuration determined at block 516 to the reconfigurable antenna. In some embodiments, the reconfigurable antenna training control system may also track each change in the designated optimal configuration and respond to each such change by increasing the gain of the reconfigurable antenna by an incremental value to overcome higher interference. In contrast, each time a training session results in no change of the optimal configuration, the reconfigurable antenna training control system in an embodiment may decrease the gain of the reconfigurable antenna by an incremental value.

At block 522, in an embodiment in which the reconfigurable antenna training control system could not identify an optimal configuration over the most recent training window at 514, the reconfigurable antenna training control system may place the antenna back into an acquisition mode. When placed back into an acquisition mode, the reconfigurable antenna training control system in an embodiment may perform a new training window in which each of the available configurations is considered equally viable as the next optimal configuration. As such, the reconfigurable antenna training control system in such an embodiment may dedicate an equal amount of time toward testing of each of the candidate configurations.

The reconfigurable antenna training control system in an embodiment in which the antenna is returning to the acquisition mode may determine an optimal duration of the next training window for such an acquisition mode at block 524. In such an embodiment, the reconfigurable antenna training control system may consider all available configurations as candidates for the optimal configuration, and may not increase or decrease window length based on previous identification of any configuration as locked. However, the reconfigurable antenna training control system may still apply a weighting based on current and past stability of each candidate configuration in such an embodiment. For example, the reconfigurable antenna training control system in such an embodiment may determine a new acquisition mode (A2) training window duration for any of the available configurations ($WL_{Candidate}(i+1)$) using the following equation, rounded to the nearest integer value:

$$WL_{Candidate}(i+1) = \frac{2 * \text{AVG\_VAR}(i)}{\sigma_{TRA}^2(i)} \qquad [15]$$

The method may then end. Upon determination of the optimal duration of the next training window in acquisition mode, the reconfigurable antenna training control system in an embodiment may repeat the method of FIG. 3, following expiration of the timer. In other embodiments, the reconfigurable antenna training control system may immediately move into a new training session when moved from the tracking mode back to the acquisition mode, such that little or no time elapses between the most recent tracking mode training window and the next acquisition mode training window. When repeating the process of FIG. 3 in such embodiments, the preset duration of the training window described at block 306 may be equivalent to the optimal training window length for the acquisition mode determined at block 524.

The blocks of the flow diagrams of FIGS. 3-5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system operating a configurable antenna training system comprising:
    a configurable antenna system in a candidate configuration transceiving a radio frequency signal over a preset training time period, wherein the candidate configuration is one of a plurality of configurations in which the configurable antenna may transceive radio frequency signals, and wherein the preset training time period has been set based on historical performance metric values and historical stability metric values for the candidate configuration;
    a radio frequency system measuring a plurality of values for at least one performance metric for the radio frequency signal transceived by the configurable antenna system in the candidate configuration over the preset training time period;
    an antenna front end system determining a candidate configuration weighted performance metric based on the plurality of values for the at least one performance metric over the preset training time period and on historical values for the at least one performance metric for the candidate configuration;
    the antenna front end system comparing the candidate configuration weighted performance metric to a weighted performance metric determined for another of the plurality of configurations;
    the antenna front end system identifying one of the plurality of configurations having a highest weighted performance metric as an optimal configuration; and
    the configurable antenna operating in the optimal configuration to establish a wireless link.

2. The information handling system of claim 1 further comprising:
    the antenna front end system determining a candidate configuration weighted stability metric for the candidate configuration by comparing the plurality of values for the at least one performance metric measured over the preset training time period to the candidate configuration weighted performance metric.

3. The information handling system of claim 1, wherein the candidate configuration weighted performance metric is further determined based on a number of previous training windows.

4. The information handling system of claim 1, wherein the determination of the candidate configuration weighted performance metric excludes one or more of the plurality of values for the at least one performance metric measured over the preset training time period falling below a minimum threshold value.

5. The information handling system of claim 1, wherein the determination of the candidate configuration weighted performance metric excludes one or more of the plurality of values for the at least one performance metric measured over the preset training time period exceeding a maximum threshold value.

6. The information handling system of claim 1, wherein the determination of the candidate configuration weighted performance metric excludes one or more of the plurality of values for the at least one performance metric measured for a wireless link operating in the 2.4 GHz frequency band.

7. The information handling system of claim 1, wherein an adjustable idle time period determined based on a measured data rate and an average of weighted variance values for each of the plurality of configurations elapses between the end of the preset training period and an initiation of another training period.

8. A method for optimizing duration of configurable antenna training windows comprising:
    measuring, via a radio frequency subsystem, relative signal strength indicator (RSSI) values of each of a plurality of radio signals transceived via a configurable antenna, wherein each of the plurality of radio signals is transceived over an initial training window having an initial preset duration while the configurable antenna is operating according to one of a plurality of configurations in which the configurable antenna is capable of operating;
    determining, for each of the plurality of configurations, a weighted RSSI value based on the RSSI values measured over the initial training window and on historical RSSI values measured prior to the initial training window, for each of the plurality of configurations;
    determining, for each of the plurality of configurations, a weighted variance value based on a comparison of the RSSI values measured over the initial training window and the weighted RSSI value, for each of the plurality of configurations;
    determining for a candidate configuration, a candidate configuration optimal duration for a next training window based on a comparison of weighted RSSI values for each of the plurality of configurations and on an average of the weighted variance values for each of the plurality of configurations; and measuring RSSI values of radio signals transceived via the configurable antenna operating in the candidate configuration over the next training window having the candidate configuration optimal duration.

9. The method of claim 8, wherein the antenna front end system is in a tracking mode further comprising:
   determining a locked configuration optimal duration for the next training window that is greater than the candidate configuration optimal duration; and
   measuring RSSI values of radio signals transceived via the configurable antenna operating in the locked configuration over the next training window having the locked configuration optimal duration.

10. The method of claim 9, wherein the locked configuration optimal duration is further determined based on a Gaussian distribution of the comparison of weighted RSSI values for each of the plurality of configurations.

11. The method of claim 8, wherein the candidate configuration optimal duration is further determined based on a Gaussian distribution of the comparison of weighted RSSI values for each of the plurality of configurations.

12. The method of claim 8, wherein the candidate configuration optimal duration is further determined based on a preset maximum allowable duration.

13. The method of claim 8, wherein the candidate configuration optimal duration is further determined based on a preset minimum allowable duration.

14. The method of claim 8, wherein an adjustable idle time period determined based on a measured data rate and the average of the weighted variance values for each of the plurality of configurations elapses between the initial training window and the next training window.

15. An information handling system operating a configurable antenna training system comprising:
   a configurable antenna system in a candidate configuration transceiving a radio frequency signal over a current training window having a preset duration, wherein the candidate configuration is one of a plurality of configurations in which the configurable antenna may transceive radio frequency signals, and wherein the preset duration has been set based on historical relative signal strength indicator (RSSI) values and historical variance values determined for the candidate configuration over one or more previous training windows;
   a radio frequency system measuring a plurality of RSSI values for the radio frequency signal transceived by the configurable antenna system in the candidate configuration over the preset duration;
   an antenna front end system determining a candidate configuration weighted RSSI value based on the plurality of RSSI values over the preset duration and on historical RSSI values for the candidate configuration;
   the antenna front end system determining a candidate configuration weighted variance metric for the candidate configuration by comparing the plurality of RSSI values measured over the duration to the candidate configuration weighted RSSI value;
   the antenna front end system comparing the candidate configuration weighted RSSI value to a weighted RSSI value determined for another of the plurality of configurations;
   the antenna front end system identifying one of the plurality of configurations having a highest weighted RSSI value as an optimal configuration; and
   the configurable antenna operating in the optimal configuration to establish a wireless link.

16. The information handling system of claim 15, wherein the candidate configuration weighted variance metric is further determined based on a quantity of the one or more previous training windows.

17. The information handling system of claim 15, wherein the candidate configuration weighted RSSI value is further determined based on a quantity of the one or more previous training windows.

18. The information handling system of claim 1, wherein the determination of the candidate configuration weighted RSSI value excludes one or more of the plurality of RSSI values measured over the preset duration falling below a minimum threshold value.

19. The information handling system of claim 1, wherein the determination of the candidate configuration weighted RSSI value excludes one or more of the plurality of RSSI values measured over the preset duration exceeding a maximum threshold value.

20. The information handling system of claim 1, wherein the determination of the candidate configuration weighted RSSI value excludes one or more of the plurality of RSSI values measured for a wireless link operating in the 2.4 GHz frequency band.

* * * * *